June 13, 1944.   A. BROMS   2,351,396
FILM DEVELOPING TANK AND METHOD
Filed Jan. 8, 1941   3 Sheets-Sheet 1
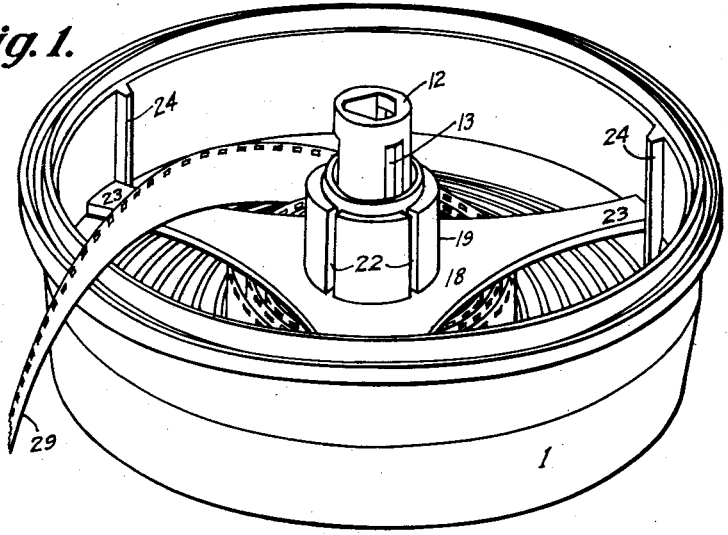
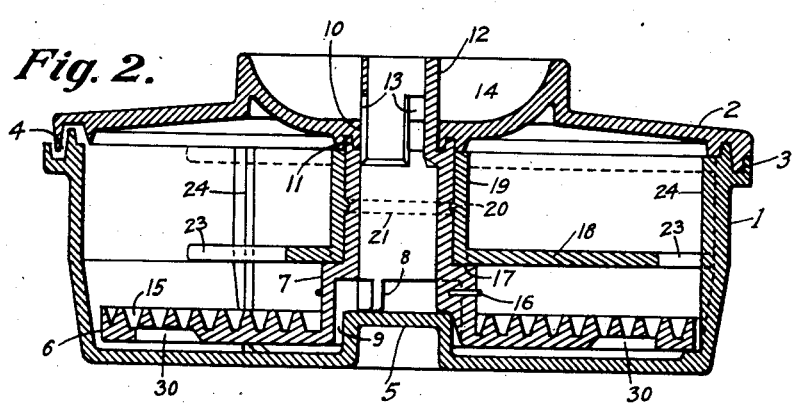
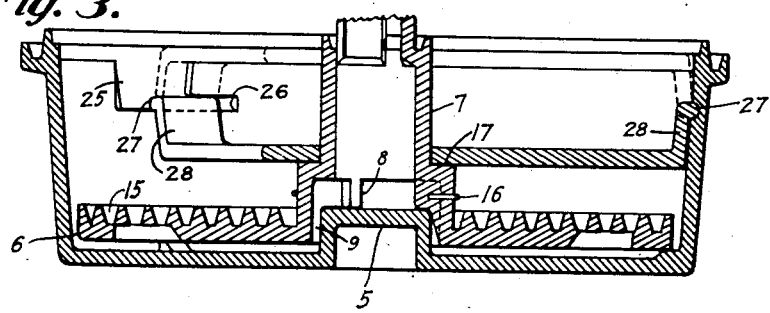
INVENTOR.
Allan Broms
BY Cornelius Zabriskie June 13, 1944.    A. BROMS    2,351,396
FILM DEVELOPING TANK AND METHOD
Filed Jan. 8, 1941    3 Sheets-Sheet 2
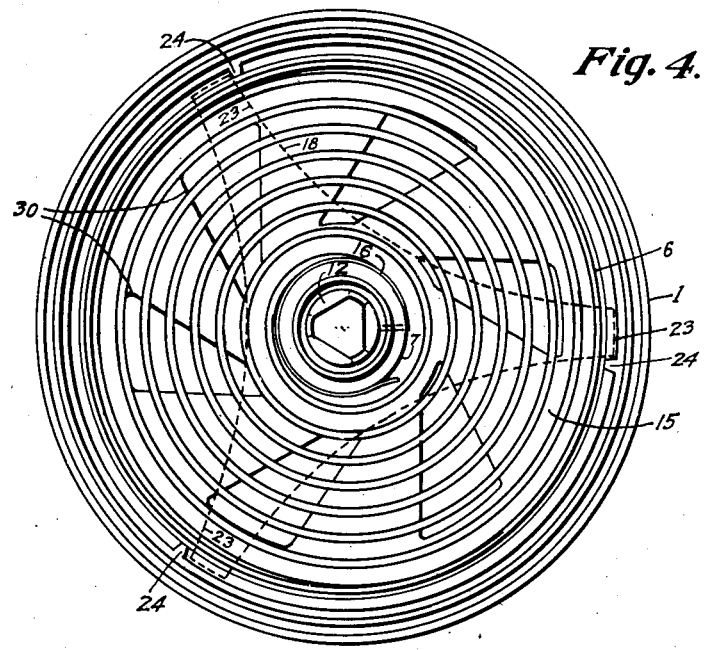
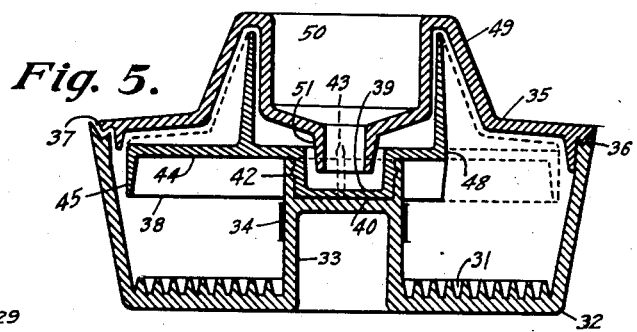
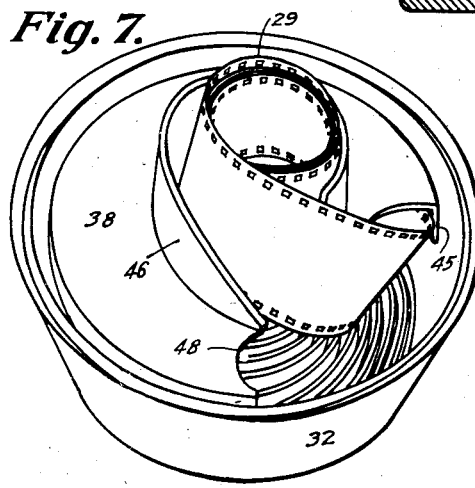
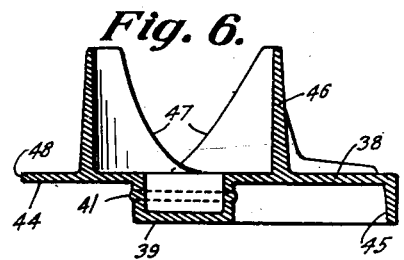
INVENTOR.
Allan Broms
BY Cornelius Zalustie June 13, 1944.  A. BROMS  2,351,396
FILM DEVELOPING TANK AND METHOD
Filed Jan. 8, 1941   3 Sheets-Sheet 3

INVENTOR.
Allan Broms
BY Cornelius Zaluski

Patented June 13, 1944

2,351,396

UNITED STATES PATENT OFFICE 2,351,396

FILM DEVELOPING TANK AND METHOD

Allan Broms, Whitestone, Long Island, N. Y.

Application January 8, 1941, Serial No. 373,582

23 Claims. (Cl. 95—90.5)

This invention relates to a method of and apparatus for processing film in the dark as well as in the light. This application is a continuation in part of my prior application, Serial No. 142,800, filed May 15, 1937.

The invention contemplates the preparation of film for processing by feeding the film to a reel provided with two opposing flanges mounted for relative rotation with respect to one another and by virtue of which rotation the feed of the film is accomplished. One of the flanges is provided with a spiral groove to receive one longitudinal margin of the film, while the other flange is devoid of such a groove, but has an opening through which the film passes into the space between the flanges. The flanges are sufficiently close to one another to hold the film in place in the groove and to insure guiding of the film into the groove as specified when one of the flanges is rotated relative to the other. One flange may be provided with an upstanding peripheral wall forming therewith a tank container for processing fluid as will hereinafter be more fully explained.

Features of the invention, other than those adverted to, will be apparent from the hereinafter detailed description and claims, when read in conjunction with the accompanying drawings.

The accompanying drawings illustrate different practical embodiments of the invention, but the constructions therein shown are to be understood as illustrative only, and not as defining the limits of the invention.

Figure 1 is a perspective view showing the preferred form of the invention, but with the cover omitted, and with a film partially wound into a spiral groove in one flange of the reel.

Figure 2 is a transverse section through the entire apparatus with the cover in place, but with the film omitted.

Figure 3 is a partial transverse section showing an alternative construction of portions of the same apparatus.

Figure 4 is a plan view of the contanier and the hub and grooved flange of the reel.

Figure 5 is a transverse section of a modified form of the invention in which the spiral groove is formed in the floor of the container.

Figure 6 is a transverse section of the plane-surfaced winder flange of the reel of Figure 5.

Figure 7 is a perspective view showing the winder of Figure 6 winding a film into the container of Figure 5.

Figure 8:
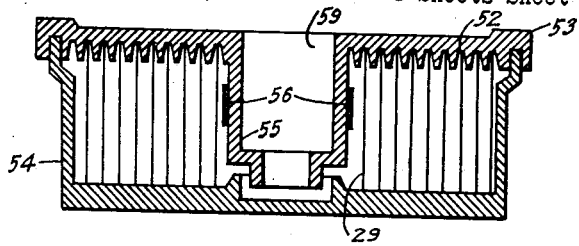
Figure 8 is a transverse section of another modified form of the invention, with the groove formed in the cover of the tank, with the winder removed, and the film in place ready for processing.
Figure 9:
Figure 9 is a side elevation of a winder of extreme simplicity.

The preferred form of the invention is show in Figures 1 to 4 inclusive. The tank proper comprises a container 1 and a cover 2. The cover is adapted to seat on the upper edge of the container wall, with a tongue and groove connection 3 between these parts to produce a light-tight joint between the cover and the container. At one point at least, a channel 4 is formed in the joint between cover and container to provide a pouring outlet through which fluid may be removed from the tank without detaching the cover, but this channel is serpentine and forms a light trap.

At the center of the container floor an upstanding plug 5 provides support for the lower flange 6 of the film reel. The inner surface of the hub 7 of this flange has suitable inward projections 8 serving as bearing points for support of the flange 6 on the plug 5. However, spaces are left between the flange and the plug, and between the several projections 8, providing channels 9 by which fluids may be poured into the tank without removing the cover 2. Above the bearing projections 8, the caliber of the bore of the hub is sharply reduced, comprising, with the angles in the channels below, a sufficient light trap. This bore is, however, kept large enough to admit a thermometer tube and bulb down into the contained fluid.

The hub 7 extends upward through a central opening 10 in the cover 2, with a tongue and groove connection 11 between the hub and the cover to provide a light-tight joint. The hub furthermore extends sufficiently above the surface of the cover to form the handle 12 for rotating of the flange 6. Lateral openings 13 are formed in this tubular handle at a level admitting fluid into its bore and thereby into the tank when poured into a suitable funnel 14 formed centrally of the cover 2.

Upon the upper surface of the lower flange 6 of the film reel is formed a spiral groove 15 extending in successive convolutions from the hub outward to the margins of the flange. A spring 16 embraces the lower portion of the hub 7 and serves as a clamp for attaching one end of the film and thus starting its feeding into the spiral groove 15.

At a suitable level above the bottom of the spiral groove, a shoulder 17 is formed around the wall of the hub 7 to hold the other flange 18 of the reel at a required minimum distance above the bottom of the spiral groove, said distance being substantially equal to the width of the narrowest film to be wound into the reel. This flange 18 is shown as of skeletonized form, with wide openings between its three arms 23 which extend outward from the hub 7 to the walls of the container 1 and with its two horizontal surfaces plane and smooth. At its center, a tubular sleeve 19 is formed, fitting closely, but rotating freely upon, the corresponding portion of the hub. If the flange 18 is placed with this sleeve extending upwardly, as shown in full lines in Figure 2, the lower surface of the flange will be at the minimum distance from the bottom of the spiral groove, permitting winding in of a film of that same minimum width. If, however, the flange 18 be placed with this sleeve extending downwardly, as shown in dotted lines in this figure, the lower surface of the flange will be at the maximum distance from the bottom of the spiral groove, permitting winding in of a film of equivalent maximum width. Within and intermediate of the ends of this sleeve, is formed an annular rib 20. In the outside of the hub 7 and at a corresponding height above the shoulder 17, a substantially complementary annular channel 21 is formed to receive the rib and hold the sleeve 19 and flange 18 against inadvertent displacement. To permit the placing and removal of the sleeve 19, its walls are vertically slotted at 22, permitting the walls to spring slightly during such placing and removal. However, the parts are so proportioned that, when the rib 20 is in the channel 21, the sleeve is free to rotate on the hub, but is held resiliently against inadvertent displacement.

Spaced to correspond with the ends of the arms 23 of the flange 18, vertical ribs 24 are formed in the walls of the container 1. Between these are inserted the ends of the flange arms 23, their engagement therewith preventing rotation of the flange 18 relative to the container 1 and thus permitting relative rotation of the grooved lower flange 6 by the turning of its hub handle 12.

Figure 3 shows an alternative construction to secure the same result. The lower ends of the suitably spaced vertical grooves 25 in the walls of the container 1 have horizontal grooves 26 long enough to serve as bayonet-type locks holding the ends 27 of the flange arms at a required level. These ends 27 are offset from the planes of the flange arms as shown at 28 to a level intermediate between the required minimum and maximum distances above the bottom of the spiral groove 15, permitting the winding in of films of either minimum or maximum width by placing the offset flange ends directed upwardly or downwardly respectively as shown by the full and dotted lines in this figure. This construction obviates the use of the annular rib 20, the annular channel 21, and the hub sleeve 19 of Figure 2.

The film is designated in the drawings by the reference character 29 It is shown as a motion picture film with sprocket holes although the invention is equally adapted for use with unperforated film. Its feeding into the reel is accomplished as shown in Figure 1. The free end of the film is first clamped between the spring 16 and the hub 7, with its lower longitudinal edge projecting into the spiral groove 15 at the inner terminus of the latter. The flange 6 is then placed in position in the container 1, with its bearing projections 8 resting on the plug 5. The upper flange 18 is then placed over the hub 7 with the ends of its arms 23 set between the ribs 24, and with the film extending diagonally upward through the opening between two arms of the upper flange 18. If the film is of the narrower width, the sleeve 19 is directed upward as shown in Figure 1, and if the film is of the greater width, then the upper flange is reversed to occupy the dotted line position of Figure 2. The sleeve is then pressed down to contact with the shoulder 17 to engage the annular rib 20 with the annular channel 21. If the upper flange be of the construction shown in Figure 3, then the ends of the arms 27 are set in the grooves 25, pressed to the bottoms thereof, and rotated horizontally to lock the ends 27 in the grooves 26, the offsets 28 being directed upward for the narrower film and downward for the wider film.

If the film 29 is rolled up, the roll may be placed over the hub handle 12 to rest upon the upper flange 18. If the film is not rolled up, it may be held extended tangentially from the edge of the container 1 or hung loosely over that edge. The hub handle is now rotated so as to draw the film forward around the hub 7 and down into the container 1 and into proper place in the spiral groove 15 of the rotating lower flange 6. During this operation of winding in, the film moves from a position above one arm of the upper flange 18, the upper surface of that arm supporting the lower edge of the film, thence downward diagonally along a substantially helical path into the container, passing forwardly under the next arm of the upper flange 18, the lower surface of that arm pressing downward on the upper edge of the film. By that pressure from above, the film is forced downwardly and held down so its lower edge engages with the spiral groove 15, and thereafter the several arms continue such pressure on the upper edge of the film to hold the lower edge permanently seated in the groove during the ensuing operations of processing.

In actual use, it will be noted that the natural bends and twists of a rolled film are availed of in this winding operation, the film in consequence feeding into correct position with ease, speed and certainty. In fact, a mere spinning of the hub handle 12 causes the film to whisk into position so rapidly that the eye can hardly follow it. Closer watching also discloses that during this winding, no part of the emulsion surface of the film is brought into contact with anything, but remains free from all sliding or damaging contacts. In fact, the film can be drawn out from the wound position, and then wound in again, without any contacts with emulsion surfaces, permitting removal of the film after partial processing, as for inspection or for exposure to light to effect image reversals in making diapositives and color transparencies, with subsequent return of the film to the reel for further processing steps. Or the fully processed film, thus withdrawn, can be wiped free of excess fluid, then returned to position in the reel, and there dried by the circulating of air between the convolutions of the film, which convolutions are readily accessible between the arms of the upper flange, thereby facilitating such drying circulation of the air.

While passing along its helical path from above to below the upper flange, the film is momentarily twisted and tilted from the vertical. But as it enters the spiral groove and follows around that groove as a loosely wound but axially flattened coil, its curvatures longitudinally force the film to straighten up to the vertical and to become transversely rigid. This causes a definite separation of its convolutions, not only at its lower edge within the spiral groove, but also at its upper and seemingly free edge. Contacts between its surfaces and consequent damages to the emulsion during processing are thereby prevented.

When the film has been completely wound into the reel and container as stated, the cover 2 is placed on the container 1, and it will be noted that the hub handle 12 then protrudes within the funnel 14 so that it can be grasped from the outside of the completely enclosed tank and twirled to rotate the grooved flange 6 and its positioned film 29 to cause circulation of the processing fluid relative to the film surfaces, thus facilitating more rapid and uniform processing, and particularly removing air bubbles from the emulsion surfaces where they would otherwise cause spotting of the processed emulsion.

The fluid can be introduced into the enclosed tank by pouring it into the funnel 14 of the cover 2. It then flows through the lateral openings 13 and down through the bore of the hub 7, through the spaces between that hub and the plug 5, and thence under the lower flange 6 into the cavity of the container 1. To facilitate such flow of fluid into the container cavity and to permit freer circulation of fluid between the convolutions of the films, openings 30 are made through the lower flange 6 to the bottom of the spiral groove 15.

The structures which I have thus far described have very pronounced advantages over prior art structures. The attachment of the film to the hub may be conveniently accomplished and after the rolled film has been placed on the upper flange and encircling the hub handle, or the unrolled film has been hung over the edge of the container, the operator's hands do not again touch the film. Simple twirling of the hub handle, while the container and upper flange remain stationary, brings about continuous winding of the film into the spiral groove in a manner to preclude contact with the emulsion surface of the film and in a way to take advantage of the natural bends and twists of a rolled film. The individual characteristics of the film, and more particularly those having to do with the weight, character of emulsion, or set of the film, make no difference in the facility with which the winding in is accomplished and the film may be wound into the tank with equal ease whether the tank or film be wet or dry. The film can be removed from the tank and returned to it while wet, but the inadvertent escape of the film from the tank cannot occur, for once the winding in starts, the film is held in position until the operation is completed and thereafter it is positively retained in place between the base of the spiral groove and the flat under surface of the upper flange.

Figures 5 to 7 inclusive disclose another structure which I have used and which embodies the present invention. It lacks some advantages of the form previously described, but it enables rapid and convenient feeding of the film into the spiral groove for processing purposes, and is free from objections of the prior art.

In this form of the invention, the spiral groove 31 is formed in the floor of the container 32, in the center of which is formed an upstanding hub 33 embraced by a clamping spring 34. The cover 35 is adapted to seat on the upper edge of the wall of the container with a tongue and groove connection 36 providing a light-tight joint, and at some point in that joint is provided a pouring outlet 37 made serpentine in course to form a light trap.

The lower spirally grooved flange 31 constitutes the floor of the container 32, while the upper plane-surfaced flange 38 forms part of a rotatable winder shown in detail in Figure 6. This winder is provided with an axial plug 39 and the upper end of the hub 33 is chambered at 40 to receive this plug. The plug is provided intermediate of its ends with an annular rib 41 and the hub chamber 40 is provided with a substantially complementary annular channel 42 to receive the rib and hold the plug against inadvertent displacement. The walls of the hub chamber are vertically slotted at 43 to permit their being sprung for the ready introduction and removal of the plug into and from the hub chamber. However, the parts are so proportioned that, when the rib 41 is in the channel 42, the plug is free to rotate therein, but is held resiliently against inadvertent detachment.

The body of the winder 38 is a plate with a plane and smooth under surface 44 having the depending central plug 39 and formed at its periphery with a depending skirt 45. The upper side of the winder is formed into a substantially cylindrical cup 46 for holding the film roll. The wall of this cup is provided with a flared slot 47 extending to the floor of the cup and providing a lateral outlet for withdrawing the film from the cup. Adjacent to this cup outlet, the winder plate is cut away to form a relatively large opening 48 through which the film may be fed downward from the outlet of the film cup into the space between the under surface 44 of the winder and the base of the spiral groove 31.

The operation whereby the film is fed into the spiral groove is as follows. The free end of the roll of film 29 is attached to the hub 33 by means of the clamping spring 34, with the lower edge of the film end inserted into the inner end of the groove 31. The film roll is then slightly unwound, drawn out and held beyond the edge of the container wall. The winder plug is inserted and pressed into the hub chamber until the rib 41 engages with the channel 42, the film 29 being meanwhile led upward through the opening 48 and the film roll then deposited in the film cup 46 on the winder. The winding of the film into the spiral groove is then accomplished by merely rotating the winder 38 in the direction leading towards the outer end of the spiral groove.

As the winder is rotated as stated, the end of the film is retained in position by the clamping spring 34, and successive portions of the film are drawn from the cup 46, led down diagonally along a substantially helical path through the opening 48, and fed progressively into the groove 31. During this operation, damaging contacts with the film emulsion surface are prevented by the flare of the cup outlet 47, by the support of the lower film edge by the upper surface and edge of the winder plate, and by the downward pressure on the upper film edge by the lower surface and edge of the winder plate. As the trailing end of the film leaves the film cup, the depending skirt 45 of the winder holds the film against snapping outwardly and assists in completing smooth winding of the film into the spiral groove.

When the film has been completely wound in as stated, the cover 35 is placed on the container 32 and it will be noted that this cover provides space for the cup 46 of the winder by forming the central portion of the cover with a chambered boss 49, the central portion of which constitutes a funnel 50. This funnel has a depending spout 51 and the plug 39 is recessed to receive this spout, the channel formed by the space between these members being serpentine to constitute a light trap. When the cover is in place, fluid can be introduced into the completely enclosed tank by pouring into the funnel 50, the fluid thereupon flowing through the spout 51 and the serpentine channel between the spout and plug recess into the film cup 46 and thence through the side outlet 47 of that cup into the container cavity in which the film is coiled. The fluid may be removed from the enclosed tank by pouring through the serpentine outlet 37.

Figures 8 to 11 inclusive show still another structure embodying my invention. In this form of the invention, the spiral groove 52 is formed in the cover 53 for the tank container 54, and the hub 55 is likewise formed in the cover. The clamping spring 56 is mounted on the hub as before. The winder is of extremely simple construction, consisting of a post 57 carrying outwardly extending and downwardly bent arms 58 which collectively serve to support the film roll and to function as an abutment to hold the film in the spiral groove. The lower end of the post 57 is adapted to be received into the central opening in the hub and to be rotatable therein.

Figure 10:
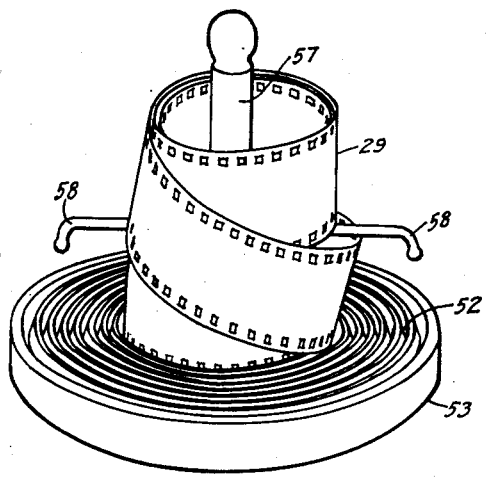
Figure 10 is a perspective view showing the winder of Figure 9 in use feeding a film into the grooved flange cover of Figure 8.

In the operation of winding the film into the groove, the cover 53 is placed upside down, the leading end of the film is attached to the hub by the spring 56, the post of the winder is inserted into the hub, and the film roll is placed around the winder post to rest on the winder arms. The winder is now rotated by twirling the post 57, and the rotating arms progressively transfer the film from the winder to the spiral groove. The one arm progressively removes support from the lower edge of the film, while the other arm progressively presses down on the upper edge of the film, forcing successive portions of the film into the spiral groove, as shown in Figure 10.

Figure 11:
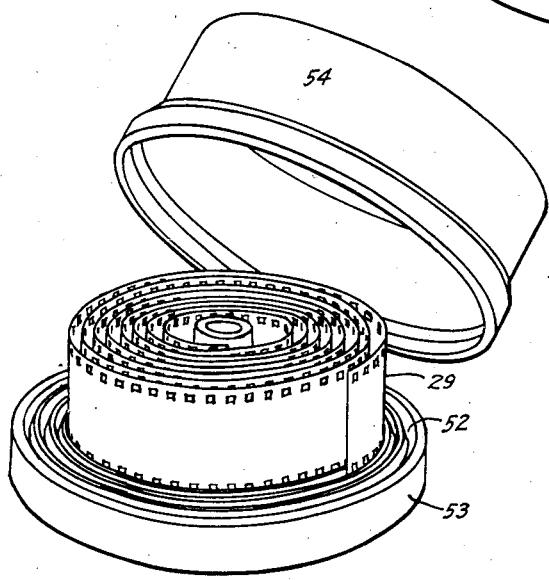
Figure 11 is a perspective view of the film as completely wound into the groove of the cover of Figure 8, with the winder removed, and the tank container ready to be placed over the film.

When the operation of winding in the film is completed, the winder is removed, and the container 54 is inverted and placed over the film as shown in Figure 11, and brought into cooperative relationship with the cover 53. The parts are then collectively inverted and thereafter the processing fluids may be introduced through the funnel-shaped chamber 59 in the cover.

While I have shown several different modifications of the invention, I wish it understood that these different forms are illustrative only and are not intended to define the limits of this invention. They all operate according to the same method of feeding the film from above into the space between two relatively rotatable flanges mounted in substantially coaxial relation to a spiral groove in one of them. The film is fed downwardly to the spiral groove in a helical manner and in a direction longitudinal of the axis of relative rotation. All these constructions eliminate the tedius and unsatisfactory practice of feeding radially into a closed reel and all of them utilize the natural bends and twists of a rolled film to facilitate the positioning of the film in the groove.

It will be apparent from the foregoing detailed description of the several devices which I have chosen to show as illustrative of this invention, that the device, in general, constitutes in effect a film reel comprising a hub with flanges, one of which is provided on its inner face with a spiral groove, while the other is plane, i. e., with the spiral groove omitted. In the constructions of Figures 1 to 4, the flanges 6 and 18 are structures separate from the container, cover and other members of the tank assembly. In the constructions of Figures 5 to 7 the floor plate of the container 32 constitutes the grooved flange of the reel, while the winder 38 constitutes the plane flange. In the constructions of Figures 8 to 11, the cover plate 53 constitutes the grooved flange of the reel, while the arms 58 of the winder constitute the other flange.

In these several constructions, the upper surface of the flange 18, the film cup 46, the winder arms 58, the hub handle 12 and the winder post 57 constitute the illustrative means for supporting and retaining the film on the end of the reel.

The reel of this invention should not, however, be confused with the reels of the prior art where the flanges are rigid with respect to each other, in contradistinction to the relative rotation between the flanges of the reel of this invention, nor should my reel be confused with those to which the film is fed from some point laterally of the reel for, in accordance with this invention, the film is fed along a substantially helical path from a point beyond one of the end plates or flanges of the reel and one of the end plates is removable, so that, after the processing operation is completed and the end flange removed, that flange which has the spiral groove therein may be inverted to permit the coil of film to fall out, in contradistinction to the laborious, time-consuming and often damaging procedure of the prior art which requires an unwinding of the film from between the two flanges of the reel by the use of force.

When the film is discharged from the groove by falling out as stated, this operation is accomplished without contact between successive convolutions of the film coil and without manual manipulation of the film. In fact the hand does not touch the film. Nevertheless the inner end of the film remains anchored to the hub, so the film does not fall free to the floor, but remains in suspended position below the grooved flange held in the hand of the operator. He may thus conveniently reach in and detach the film by grasping it close to the hub and beyond the endmost exposure thereof, to thereafter place the film in the grip of any appropriate clip or other suitable means of support, in order that it may be hung up to dry. Or in the constructions of Figures 1 to 4, the film may be withdrawn from the reel or tipped out as immediately above described, but without detaching the film end from the hub, then wiped free of excess fluid, and thereupon fed back into the reel groove as a loose coil, in which position the film may be dried by the natural or forced circulation of air between the readily accessible convolutions of the coil.

Having thus fully described the invention, what I claim as new and desire to secure by Letters Patent is:

1. A film reel comprising spaced apart flanges, one of which is rotatable while the other is held stationary, one of said flanges being provided on its inner face with a spiral groove, while the other of said flanges constitutes an abutment to hold wound film in the groove and is provided on its exterior face with means for supporting the film to be fed to said groove.

2. A film reel comprising a hub and relatively rotatable end members, one of which may be rotated while the other remains stationary, one of said end members being provided on its inner face with a spiral groove, while the other end member is provided externally with means for supporting a film and having an opening through which the film may be fed into the space between said member, and means for anchoring the leading end of the film with one longitudinal edge thereof in the inner terminus of the spiral groove.

3. In a device of the character described, a member having a spiral groove, a unitary combined film support, feeder and winder rotatable coaxially of the groove for supporting, feeding and winding a film into the groove, and having an abutment uniformly spaced from the base of the groove a distance substantially equal to the width of the film to hold the wound film in the groove.

4. In a device of the character described, a member having a spiral groove and provided at the inner terminus of said groove with a hub, and a combined film support, feeder and winder mounted for bodily rotation on the hub coaxially of the groove for supporting, feeding and winding a film into the groove, and having an abutment uniformly spaced from the base of the groove a distance substantially equal to the width of the film to hold the wound film in the groove.

5. In a device of the character described, a member having a spiral groove and provided at the inner terminus of said groove with a hub, and a combined film support, feeder and winder mounted for bodily rotation on the hub coaxially of the groove for supporting, feeding and winding a film into the groove, and having a substantially smooth face uniformly spaced from the base of the groove a distance substantially equal to the width of the film to hold the wound film in the groove.

6. In a device of the character described, a member having a spiral groove and a bodily rotatable combined film support, feeder and winder mounted for rotation coaxially of the groove for supporting, feeding and winding film into the groove and holding the wound film in the groove, said film support, feeder and winder being detachably mounted with respect to the groove to permit of bodily removal of the film after processing thereof.

7. In a device of the character described, a stationary plate provided in one of its faces with a spiral groove, means for anchoring one end of a film roll to said plate with one longitudinal edge of said end of the film in one terminus of the groove, and relatively rotatable coaxial means for supporting the film roll and for feeding consecutive portions thereof to the groove and holding them therein.

8. In a device of the character described, a plate provided on one of its faces with a spiral groove, a winder mounted for rotation coaxially of said plate and with respect thereto and axially spaced therefrom and having means for supporting a film roll in substantially coaxial relation with the axis of rotation of the winder, and means for anchoring the free end of the film roll with one longitudinal edge of the latter in one terminus of the spiral groove.

9. In a device of the character described, a relatively stationary plate provided in one face thereof with a spiral groove, a winder supported on the plate for rotation relative thereto and in spaced relation to the plate and adapted to support a film roll in substantially coaxial relation to the groove, and means for anchoring the free end of the film with one of its longitudinal edges in one terminus of the groove.

10. In a device of the character described, a plate provided on one of its faces with a spiral groove and having a hub at the inner terminus of said groove, means for attaching one end of a film to the hub with one longitudinal edge of the film in the contiguous terminus of the groove, a winder rotatably mounted on the hub and adapted to support the film roll, said winder being adapted, when rotated, to feed consecutive portions of the film to the groove and bear against the opposite edge of the film to force the film into the groove.

11. In a device of the character described, a plate provided on one of its faces with a spiral groove, means for anchoring one end of a roll of film with one longitudinal edge thereof in the groove, a winder coaxial with the groove and axially spaced therefrom and mounted for rotation while the plate with the groove remains stationary.

12. In a device of the character described, a plate provided on one of its faces with a spiral groove, means for anchoring one end of a roll of film with one longitudinal edge thereof in the groove, a winder coaxial with the groove and axially spaced therefrom and mounted for rotation while the plate with the groove remains stationary, and means on the winder for supporting the film roll in substantially coaxial relation with the spiral groove, said winder being adapted, when rotated, to feed the film therefrom along a substantially coaxial helical path to the groove and having means for applying pressure to the other longitudinal edge of the film to force the opposite edge of the film into the groove as the film is progressively fed thereto.

13. In a device of the character described, a plate provided on one of its faces with a spiral groove, means for anchoring one end of a roll of film with one longitudinal edge thereof in the groove, a winder coaxial with the groove and axially spaced therefrom and mounted for rotation while the plate with the groove remains stationary, said winder being adapted, when rotated, to feed the film therefrom along a substantially coaxial helical path to the groove and having means for applying pressure to the other longitudinal edge of the film to force the opposite edge of the film into the groove as the film is progressively fed thereto.

14. A film reel comprising a hub and spaced apart flanges, one of which is rotatable while the other is held stationary, the stationary flange being provided on its inner face with a spiral groove and the rotatable flange being provided on its outer face with means for supporting a roll of film in substantially coaxial relation to the reel, and said latter flange having an opening through which a film may be fed to the groove through relative rotation of said flanges.

15. A film reel comprising spaced apart flanges, one of which is provided on its inner face with a spiral groove, and the other of which is axially rotatable with reference to the grooved flange and constitutes a winder, the grooved flange being provided with a peripheral wall forming with said flange a container for processing fluids.

16. In a device of the character described, a tank comprising a container and a cover, both of which include plates and one of which is provided on its interior with a spiral groove and a centrally located hub, means for anchoring one end of a film roll to the hub with one longitudinal edge of the film in the adjacent terminus of the spiral groove, and a winder detachably mounted for rotation on the hub and provided with means for supporting the film roll to be fed to the groove as the winder is rotated.

17. A film reel comprising a hub and relatively rotatable end members, one of which may be rotated while the other remains stationary, one of said end members being provided on its inner face with spiral groove, while the other end member provides an external cross axial film support and has an off-center opening through which film is fed from said support into the space between said end members, and means for anchoring the leading end of the film with one longitudinal edge thereof in the inner terminus of the spiral groove.

18. A film reel comprising a hub and a pair of relatively rotatable opposed end members, one of which is provided on its inner face with a spiral groove and is rigid with the hub, and the other of which provides an external film support and has an off-center opening through which film is fed from said film support into the space between said end members, and means for anchoring the leading end of the film to the hub with one longitudinal edge of the film in the spiral groove.

19. A film reel comprising a hub and relatively rotatable end members, one of which may be rotated while the other remains stationary, one of said end members being provided on its inner face with a spiral groove, while the other end member provides an external cross axial film support and has an off-center opening through which film is fed from said support into the space between said end members, means for anchoring the leading end of the film with one longitudinal edge thereof in the inner terminus of the spiral groove, and means for holding one of said end members against rotation while the other end member is rotated relatively thereto to draw film from said film support through said opening and spirally position it in the space between said end members with one edge of the film in said spiral groove.

20. A film reel comprising a hub and a pair of relatively rotatable opposed end members, one of which is provided on its inner face with a spiral groove and is rigid with the hub, and the other of which provides an external film support and has an off-center opening through which film is fed from said film support into the space between said end members, means for anchoring the leading end of the film to the hub with one longitudinal edge of the film in the spiral groove, and means for holding one of said end members against rotation while the other end member is rotated relatively thereto to draw film from said film support through said opening and spirally position it in the space between said end members with one edge of the film in said spiral groove.

21. In a device of the character described, a tank container, spaced apart film reel flange members within said tank container, one of said flange members being locked to the tank container while the other is relatively rotatable with respect to the tank container, and one of said flange members having on its inner face a spiral groove while the other has an off-center opening through which film may be fed into the space between the said flange members, and means for anchoring the leading edge of a film with one longitudinal edge thereof in the inner terminus of the spiral groove to draw the film, when said flange members are relatively rotated, through said opening in one of the flange members and spirally position it in the space between said flange members with one edge of the film in said groove.

22. In a device of the character described, a tank container, a film reel within the tank container embodying a hub and spaced apart flange members, one of said flange members being locked to the tank container while the other is relatively rotatable with respect to the tank container, and one of said flange members being rigid with the hub and having on its inner face a spiral groove while the other has an off-center opening through which film may be fed into the space between the said flange members, and means for anchoring the leading edge of a film to the hub with one longitudinal edge thereof in the inner terminus of the spiral groove to draw the film, when said flange members are relatively rotated, through said opening in one of the flange members and spirally position it in the space between said flange members with one edge of the film in said groove.

23. In a device of the character described, a tank container and a cover therefor, in combination with a film reel within the tank comprising a pair of film flange members one of which is anchored to the tank and the other of which is rotatable with respect thereto and is provided with means extending through the cover to rotate such rotatable flange member, one of said flange members having therein an off-center opening through which film is fed downwardly into the space between said flange members and into a spiral groove in the inner face of the other flange member when the rotatable flange is rotated.

ALLAN BROMS.